United States Patent [19]
Burgoyne, Jr. et al.

[11] Patent Number: 4,711,737
[45] Date of Patent: Dec. 8, 1987

[54] N-TERT-BUTYL DERIVATIVES OF TOLUENEDIAMINE AND MIXTURES AS ANTIOXIDANT FOR ORGANIC MATERIALS

[75] Inventors: William F. Burgoyne, Jr., Allentown; Dale D. Dixon, Kutztown, both of Pa.

[73] Assignee: Air Products and Chemicals, Inc., Allentown, Pa.

[21] Appl. No.: 946,564

[22] Filed: Dec. 24, 1986

[51] Int. Cl.$^4$ .................... C09K 15/18; C10M 133/12
[52] U.S. Cl. ...................... 252/77; 252/401; 252/50; 564/305; 524/254
[58] Field of Search ............ 252/50, 77, 401; 524/254; 564/305

[56] References Cited

U.S. PATENT DOCUMENTS

| | | | |
|---|---|---|---|
| 2,645,674 | 7/1953 | Kinney | 252/589 |
| 2,692,287 | 10/1954 | Bell et al. | 564/305 |
| 2,692,288 | 10/1954 | Bell et al. | 564/305 |
| 3,230,257 | 1/1966 | Schmerling | 252/401 |
| 4,456,541 | 6/1984 | Wright | 252/401 |

Primary Examiner—Robert A. Wax
Attorney, Agent, or Firm—Russell L. Brewer; James C. Simmons; William F. Marsh

[57] ABSTRACT

This invention relates to the use of tertiary butyl derivatives of toluenediamine and specifically N-tert-butyl-2,6-toluenediamine as an antioxidant material for preventing oxidation of organic materials.

6 Claims, No Drawings

N-TERT-BUTYL DERIVATIVES OF TOLUENEDIAMINE AND MIXTURES AS ANTIOXIDANT FOR ORGANIC MATERIALS

BACKGROUND OF THE INVENTION

1. Field of the Invention

This invention relates to the use of N-tert-butyl-2,6-toluenediamine as an antioxidant for the prevention of oxidation of organic materials.

2. Description of the Prior Art

Aromatic amines and N-alkylated aromatic amines have been long recognized as antioxidant materials for a variety of organic compositions such a rubber, plastics, fuel oil, lubricating oils, mineral oil, motor fuels and the like. The following patents are deemed representative of some of the prior art with respect to the use of aromatic amines as an antioxidant.

U.S. Pat. No. 2,645,674 discloses a method for producing a stabilized rubber adhesive composition by incorporating various amounts of aromatic diamine into the rubber as an antioxidant. Examples of aromatic amines include p-phenylenediamine; 1,5-naphthalenediamine; N-cyclohexyl-p-phenylenediamine and ortho-tolyl-$\beta$-naphthylamine.

U.S. Pat. No. 3,230,257 discloses the preparation of nuclear and N-alkylated aromatic amines and the use of these aromatic amines is antioxidants in mineral oil, lubricating oils, etc. Aromatic amines which are suitable for alkylation include 2,4-dibutylaniline and ethylated p-toluidine. Phenylenediamines are suggested as candidate amines.

U.S. Pat. No. 3,923,892 discloses the manufacture of alkylated aromatic amines and suggests their use as antioxidant materials. Examples of aromatic amines include methyl bis(aniline) and p-phenylenediamines. Diisobutylaniline and 2,3,5,6-tetraethyl-1,4-diaminobenzene are also suggested.

U.S. Pat. Nos. 2,692,287 and 2,692,288 disclose the production of N-tert-alkylated aromatic amines and the use as antioxidants. Example 6 of the U.S. Pat. No. 2,692,287 patent shows the manufacture and use of N-tert-butyl-2,4-diaminotoluene as an antioxidant for lubricating oils.

U.S. Pat. No. 4,456,541 discloses the use of various aromatic diamines as antioxidant materials, and specifically alkylated derivatives of toluenediamine. Of these aromatic diamines, the diethylated derivatives of the 2,4 and 2,6-isomers of toluenediamine are shown as being particularly effective antioxidant materials.

SUMMARY OF THE INVENTION

This invention relates to the use of N-tert-butyl-2,6-toluenediamine as an antioxidant for the prevention of oxidation of organic materials e.g. rubber and hydrocarbon oils which are susceptible to gradual degradation in the presence of oxygen during the use over an extended period of time and of the type in which aromatic diamines have been added as an antioxidant for hydrocarbon oils such as fuel oils, lubricating oils, etc. Although aromatic diamines have been known to exhibit antioxidant properties, N-tert-butyl-2,6-toluenediamine is particularly effective as an antioxidant in that it imparts substantially extended oxidation times to oils, lubricants, etc.

DETAILED DESCRIPTION OF THE INVENTION

The antioxidant material of this invention is N-tert-butyl-2,6-toluenediamine. Mixtures of N-tert-butyl-2,6-toluene diamine with other aromatic diamines can also be used although the effectiveness may be reduced by a dilution effect. Of particular usefulness is a mixture of N-tert-butyl-2,6-toluenediamine with 2N-tert-butyl-2,4-toluenediamine or 4-N-tert-butyl-2,4-toluenediamine consisting of about 20–35% by weight of N-tert-butyl-2,6-toluenediamine and 65–80% by weight of the combined N-tert-butyl-2,4-toluenediamines. The quantity of antioxidant toluenediamine derivatives incorporated into an organic substrate such as rubber or hydrocarbon oil will generally range from about 0.1–10%, preferably 0.25 to 5% by weight, although the amount can be varied in accordance with engineering procedure. Of course, as the level of aromatic diamine is reduced in the organic substrate, there may be a tendency to detract from the overall resistance to oxidation and levels above about 5 by weight may not significantly increase resistance to oxidation.

The aromatic diamine is incorporated into the organic substrate in conventional manner, and in those cases where the substrate is a solid, the use of a solvent may be required. Examples of suitable organic solvents include gasoline, petroleum naphtha, benzene, toluene, and chlorinated solvents such as propylene chloride and carbon tetrachloride. In addition, the antioxidant compound may be milled into rubber or other millable substrates. The aromatic diamine has particular utility in lubricating oils, fuel oils and mineral oils.

The following examples are provided to illustrate preferred embodiments of the synthesis and use of the aromatic diamines as an antioxidant material.

EXAMPLE 1

Preparation of N-tert-butyl-2,4-toluenediamines

A 15.0 g. portion of powdered montmorillonite K-10 Clay and 150.0 g. (1.23 mil) of 2,4-toluenediamine were charged to a 1000 cc. Hastalloy C pressure vessel equipped with a mechanical stirrer. The vessel was sealed and purged with nitrogen leaving a residual 32 psig nitrogen blanket. The vessel contents were heated to 180° C. with stirring at 500 rpm. Isobutylene (279.0 g, 4.98 mol) was then added over 2 hours, resuting in 1210 psig vessel pressure. This provided a mole ratio of 4.05 isobutylene to 1 mole toluenediamine. The reaction mixture was maintained at 180° C. for 23 hours with constant stirring. The contents were cooled to 150° C. and then stirring was discontinued and the residual pressure vented. Removal of the catalyst by hot filtration afforded the following product mixture:

|  | Mole % |
| --- | --- |
| 2,4-toluenediamine | 57.82 |
| 2-(tert-butylamino)-4-aminotoluene | 5.49 |
| 2-amino-4-(tert-butylamino)toluene | 18.27 |
| 5-tert-butyl-2,4-toluenediamine | 16.85 |
| di-tert-butyl-2,4-toluenediamines | 1.58 |

EXAMPLE 2

Preparation of N-tert-butyl-2,6-toluenediamine

A 15.0 g. portion of powdered H-Y zeolite catalyst and 150.0 g. (1.15 mol) of 2,6-toluenediamine were charged to a 1000 cc Hastalloy C pressure vessel equipped with a mechanical stirrers as was done in Example 1. The vessel was sealed and purged with nitrogen leaving a residual 200 psig nitrogen blanket at room temperature. The contents were heated to 160° C. with stirring. Isobutylene (327 g., 5.82 mol) was then added to the reaction mixture over 20 minutes, resulting in an initial reaction pressure of 1080 psig. This provided a molar ratio of 4.7:1 isobutylene to toluenediamine. The reaction mixture was maintained at 160° C. for 21 hours with constant stirring. The reaction product was isolated by the procedure used in Example 1 and consisted of the following composition:

|  | Mole % |
|---|---|
| 2,6-toluenediamine | 61.56 |
| 2-(tert-butylamino)-6-aminotoluene | 9.09 |
| 3-tert-butyl-2,6-toluenediamine | 29.34 |

EXAMPLE 3

Antioxidant Testing in Oil

The test candidate toluenediamines were evaluated for antioxidant properties for hydraulic oil. The evaluation was performed by the ASTM method D2272-67 entitled "Oxidation Stability of Steam Turbine Oils by Rotating Bomb" using Sunvis 21 (a light hydraulic oil) as the test oil. A good antioxidant will have an oxidation inhibition time (BROT) greater than 150 min. at 0.5 wt. % utilization. The RBOT value of an antioxidant reflects its antioxidant capacity.

The chemicals designation and their respective test results at 0.5% by weight are tabulated as follows:

| Test Compound (0.5 wt % in Mineral Oil) | RBOT Time (min) |
|---|---|
| 2-(tert-butylamino)-6-aminotoluene | 354 |
| Mixture by weight: | |
| 2-(tert-butylamino)-6-aminotoluene (20.8%) | |
| 2-(tert-butylamino)-4-aminotoluene (33.4%) | |
| 4-(tert-butylamino)-2-aminotoluene (45.8%) | 305 |
| 5-tert-butyl-2,4-toluenediamine | 277 |
| 4-(tert-butylamino)-2-aminotoluene | 275 |
| 3,5-diethyl-2,6-toluenediamine | 215 |
| 5-isopropyl-2,4-toluenediamine | 215 |
| 3,5-diethyl-2,4-toluenediamine | 175 |
| 3-isopropyl-2,6-toluenediamine | 170 |
| 3-tert-butyl-2,6-toluenediamine | 155 |
| Agerlite Stalite S* | 151 |
| 2,6-toluenediamine | 150 |
| 2,4-toluenediamine | 118 |
| 5-tert-butyl-3,4-toluenediamine | 90 |
| Control Medium - Sunvis 21 Mineral Oil without antioxidant additive | 33 |
| 3,5-di-tert-butyl-2,6-toluenediamine | 16 |

*a commercially available antioxidant comprised of octylated diphenylamines

Of the above test compounds, it can be seen that 2-(tert-butylamino)-6-aminotoluene has the best RBOT time in minutes and is significantly better than other aromatic diamines including 4-(tert-butylamino)-2-aminotoluene specifically referred to in the prior art, i.e., U.S. Pat. No. 2,692,287 and U.S. Pat. No. 2,692,288 and the diethyltoluenediamines specifically referred to in the prior art, i.e. U.S. Pat. No. 4,456,541. Surprising the ditertiary butyl derivative of 2,6-toluenediamine actually accelerated oxidation rather than prevented oxidation in view of the fact that the control without any antioxidant material had an RBOT time of 33 minutes. Thus, the data show the mono-N-tert-butyl derivative of 2,6-toluenediamine, specifically 2-(tert-butylamino)-6-aminotoluene has greater antioxidant capacity than its structural isomer, i.e., 4-(tert-butylamino)-2-aminotoluene. To summarize, the above data show that 2-(tert-butylamino)-6-aminotoluene is extremely effective as an antioxidant for oils.

What is claimed is:

1. In an organic material normally susceptible to gradual degradation in the presence of oxygen during use over an extended period of time and of the type in which an aromatic diamine has been added as an antioxidant, the improvement which comprises utilizing 2-(tert-butylamino)-6-aminotoluene as any aromatic diamine antioxidant.

2. The organic material of claim 1 wherein the level of 2-(tert-butylamino)-6-aminotoluene) is from 0.1 to 10% by weight in said organic material.

3. The organic material of claim 1 wherein said organic material is a hydrocarbon oil and the level present in said hydrocarbon oil is from 0.25–5% by weight.

4. The organic material of claim 4 wherein said hydrocarbon oil is mineral oil.

5. The organic material of claim 4 wherein said hydrocarbon oil is a hydraulic oil.

6. The organic material of claim 1 wherein said material is rubber.

* * * * *